US009275053B2

(12) United States Patent
Ramos et al.

(10) Patent No.: US 9,275,053 B2
(45) Date of Patent: Mar. 1, 2016

(54) DECODING A WATERMARK AND PROCESSING IN RESPONSE THERETO

(75) Inventors: Daniel O. Ramos, Beaverton, OR (US); Kevin C. Jones, Portland, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 1099 days.

(21) Appl. No.: 13/288,194

(22) Filed: Nov. 3, 2011

(65) Prior Publication Data

US 2012/0045089 A1 Feb. 23, 2012

Related U.S. Application Data

(60) Division of application No. 11/924,914, filed on Oct. 26, 2007, now Pat. No. 8,091,025, which is a continuation of application No. 09/636,102, filed on Aug. 10, 2000, now abandoned.

(60) Provisional application No. 60/191,778, filed on Mar. 24, 2000.

(51) Int. Cl.
*G06F 3/048* (2013.01)
*G06F 17/30* (2006.01)
*H04N 1/32* (2006.01)

(52) U.S. Cl.
CPC .... *G06F 17/30026* (2013.01); *G06F 17/30047* (2013.01); *G06F 17/30058* (2013.01); *H04N 1/32144* (2013.01); *H04N 2201/3233* (2013.01); *H04N 2201/3246* (2013.01)

(58) Field of Classification Search
None
See application file for complete search history.

(56) References Cited

U.S. PATENT DOCUMENTS

| 4,238,849 A | 12/1980 | Gassmann |
| 5,228,056 A | 7/1993 | Schilling |
| 5,450,490 A | 9/1995 | Jensen et al. |

(Continued)

FOREIGN PATENT DOCUMENTS

| WO | WO9743736 | 11/1997 |
| WO | WO9918723 | 4/1999 |

(Continued)

OTHER PUBLICATIONS

U.S. Appl. No. 09/343,104, filed Jun. 29, 1999, Tony F. Rodriguez, et al.

(Continued)

*Primary Examiner* — Thanh Vu

(57) ABSTRACT

Watermark encoders and decoders can be integrated into operating systems, Internet browsers, media players, and other applications and devices. Such integration enables the watermark-enabled application or device to provide additional functionality and information available via the watermark. The watermark, for example, may link to metadata or actions related to a media object. To exploit this watermark enabled functionality, the integrated application uses a watermark decoder to access the related metadata and actions. The user interface of the integrated application is enhanced to present metadata and actions linked via the watermark. Similarly, watermark encoders may be integrated into applications to convert media objects into enhanced, watermarked objects. A variety of other arrangements and features are also detailed. Many arrangements can be implemented using object identifiers other than watermarks.

20 Claims, 7 Drawing Sheets

(56) References Cited

U.S. PATENT DOCUMENTS

| | | | |
|---|---|---|---|
| 5,510,900 A | 4/1996 | Shirochi et al. | |
| 5,606,609 A * | 2/1997 | Houser et al. | 713/179 |
| 5,801,689 A * | 9/1998 | Huntsman | 715/733 |
| 5,857,038 A | 1/1999 | Owada et al. | |
| 5,862,260 A | 1/1999 | Rhoads | |
| 5,905,800 A | 5/1999 | Moskowitz et al. | |
| 6,122,403 A | 9/2000 | Rhoads | |
| 6,182,218 B1 | 1/2001 | Saito | |
| 6,185,683 B1 | 2/2001 | Ginter et al. | |
| 6,226,387 B1 | 5/2001 | Tewfik et al. | |
| 6,229,924 B1 | 5/2001 | Rhoads et al. | |
| 6,233,347 B1 | 5/2001 | Chen et al. | |
| 6,233,684 B1 | 5/2001 | Stefik et al. | |
| 6,272,176 B1 | 8/2001 | Srinivasan | |
| 6,272,634 B1 | 8/2001 | Tewfik et al. | |
| 6,278,792 B1 | 8/2001 | Cox et al. | |
| 6,307,949 B1 | 10/2001 | Rhoads | |
| 6,311,214 B1 | 10/2001 | Rhoads | |
| 6,314,192 B1 | 11/2001 | Chen et al. | |
| 6,332,194 B1 | 12/2001 | Bloom et al. | |
| 6,334,187 B1 | 12/2001 | Kadono | |
| 6,345,256 B1 | 2/2002 | Milsted et al. | |
| 6,381,341 B1 | 4/2002 | Rhoads | |
| 6,385,329 B1 | 5/2002 | Sharma et al. | |
| 6,398,245 B1 | 6/2002 | Gruse et al. | |
| 6,408,082 B1 | 6/2002 | Rhoads et al. | |
| 6,418,232 B1 | 7/2002 | Nakano et al. | |
| 6,421,070 B1 | 7/2002 | Ramos et al. | |
| 6,424,725 B1 | 7/2002 | Rhoads et al. | |
| 6,425,081 B1 | 7/2002 | Iwamura | |
| 6,427,012 B1 | 7/2002 | Petrovic | |
| 6,456,726 B1 | 9/2002 | Yu et al. | |
| 6,516,079 B1 | 2/2003 | Rhoads et al. | |
| 6,522,770 B1 | 2/2003 | Seder et al. | |
| 6,535,617 B1 | 3/2003 | Hannigan et al. | |
| 6,542,927 B2 | 4/2003 | Rhoads | |
| 6,553,129 B1 | 4/2003 | Rhoads | |
| 6,567,533 B1 | 5/2003 | Rhoads | |
| 6,580,808 B2 | 6/2003 | Rhoads | |
| 6,590,996 B1 | 7/2003 | Reed et al. | |
| 6,611,607 B1 | 8/2003 | Davis et al. | |
| 6,614,914 B1 | 9/2003 | Rhoads et al. | |
| 6,647,128 B1 | 11/2003 | Rhoads | |
| 6,647,130 B2 | 11/2003 | Rhoads | |
| 6,650,761 B1 | 11/2003 | Rodriguez et al. | |
| 6,654,479 B1 | 11/2003 | Liao et al. | |
| 6,681,028 B2 | 1/2004 | Rodriguez et al. | |
| 6,681,029 B1 | 1/2004 | Rhoads | |
| 6,694,042 B2 | 2/2004 | Seder et al. | |
| 6,694,043 B2 | 2/2004 | Seder et al. | |
| 6,700,990 B1 | 3/2004 | Rhoads | |
| 6,700,995 B2 | 3/2004 | Reed | |
| 6,704,869 B2 | 3/2004 | Rhoads et al. | |
| 6,718,046 B2 | 4/2004 | Reed et al. | |
| 6,718,047 B2 | 4/2004 | Rhoads | |
| 6,721,440 B2 | 4/2004 | Reed et al. | |
| 6,748,533 B1 | 6/2004 | Wu | |
| 6,760,463 B2 | 7/2004 | Rhoads | |
| 6,763,123 B2 | 7/2004 | Reed et al. | |
| 6,768,809 B2 | 7/2004 | Rhoads et al. | |
| 6,775,392 B1 | 8/2004 | Rhoads | |
| 6,785,815 B1 | 8/2004 | Serret-Avila | |
| 6,798,894 B2 | 9/2004 | Rhoads | |
| 6,807,285 B1 | 10/2004 | Iwamura | |
| 6,813,366 B1 | 11/2004 | Rhoads | |
| 6,879,701 B1 | 4/2005 | Rhoads | |
| 6,917,724 B2 | 7/2005 | Seder et al. | |
| 6,920,232 B2 | 7/2005 | Rhoads | |
| 6,947,571 B1 | 9/2005 | Rhoads et al. | |
| 6,959,288 B1 | 10/2005 | Medina et al. | |
| 6,965,683 B2 | 11/2005 | Hein, III | |
| 6,975,746 B2 | 12/2005 | Davis et al. | |
| 6,988,202 B1 | 1/2006 | Rhoads et al. | |
| 6,990,584 B1 | 1/2006 | Yoshiura | |
| 6,996,252 B2 | 2/2006 | Reed et al. | |
| 7,003,731 B1 | 2/2006 | Rhoads et al. | |
| 7,006,555 B1 | 2/2006 | Srinivasan | |
| 7,020,285 B1 | 3/2006 | Kirovski et al. | |
| 7,024,016 B2 | 4/2006 | Rhoads et al. | |
| 7,027,614 B2 | 4/2006 | Reed | |
| 7,035,427 B2 | 4/2006 | Rhoads | |
| 7,044,395 B1 | 5/2006 | Davis et al. | |
| 7,046,808 B1 | 5/2006 | Metois | |
| 7,051,086 B2 | 5/2006 | Rhoads et al. | |
| 7,054,465 B2 | 5/2006 | Rhoads | |
| 7,058,809 B2 | 6/2006 | White | |
| 7,062,069 B2 | 6/2006 | Rhoads | |
| 7,095,871 B2 | 8/2006 | Jones et al. | |
| 7,111,170 B2 | 9/2006 | Rhoads et al. | |
| 7,113,614 B2 | 9/2006 | Rhoads | |
| 7,123,740 B2 | 10/2006 | McKinley | |
| 7,127,065 B1 | 10/2006 | Depovere et al. | |
| 7,139,408 B2 | 11/2006 | Rhoads et al. | |
| 7,142,691 B2 | 11/2006 | Levy | |
| 7,158,654 B2 | 1/2007 | Rhoads | |
| 7,164,780 B2 | 1/2007 | Brundage et al. | |
| 7,171,016 B1 | 1/2007 | Rhoads | |
| 7,174,031 B2 | 2/2007 | Rhoads et al. | |
| 7,177,443 B2 | 2/2007 | Rhoads | |
| 7,213,757 B2 | 5/2007 | Jones et al. | |
| 7,224,819 B2 | 5/2007 | Levy et al. | |
| 7,248,717 B2 | 7/2007 | Rhoads | |
| 7,261,612 B1 | 8/2007 | Hannigan et al. | |
| 7,305,104 B2 | 12/2007 | Carr et al. | |
| 7,308,110 B2 | 12/2007 | Rhoads | |
| 7,313,251 B2 | 12/2007 | Rhoads | |
| 7,319,775 B2 | 1/2008 | Sharma et al. | |
| 7,330,564 B2 | 2/2008 | Brundage et al. | |
| 7,369,676 B2 | 5/2008 | Hein, III | |
| 7,369,678 B2 | 5/2008 | Rhoads | |
| 7,377,421 B2 | 5/2008 | Rhoads | |
| 7,391,880 B2 | 6/2008 | Reed et al. | |
| 7,406,214 B2 | 7/2008 | Rhoads et al. | |
| 7,424,131 B2 | 9/2008 | Alattar et al. | |
| 7,427,030 B2 | 9/2008 | Jones et al. | |
| 7,433,491 B2 | 10/2008 | Rhoads | |
| 7,444,000 B2 | 10/2008 | Rhoads | |
| 7,444,392 B2 | 10/2008 | Rhoads et al. | |
| 7,450,734 B2 | 11/2008 | Rodriguez et al. | |
| 7,460,726 B2 | 12/2008 | Levy et al. | |
| 7,466,840 B2 | 12/2008 | Rhoads | |
| 7,486,799 B2 | 2/2009 | Rhoads | |
| 7,502,759 B2 | 3/2009 | Hannigan et al. | |
| 7,508,955 B2 | 3/2009 | Carr et al. | |
| 7,515,733 B2 | 4/2009 | Rhoads | |
| 7,536,034 B2 | 5/2009 | Rhoads et al. | |
| 7,537,170 B2 | 5/2009 | Reed et al. | |
| 7,545,952 B2 | 6/2009 | Brundage et al. | |
| 7,564,992 B2 | 7/2009 | Rhoads | |
| RE40,919 E | 9/2009 | Rhoads | |
| 7,602,978 B2 | 10/2009 | Levy et al. | |
| 7,628,320 B2 | 12/2009 | Rhoads | |
| 7,643,649 B2 | 1/2010 | Davis et al. | |
| 7,650,009 B2 | 1/2010 | Rhoads | |
| 7,653,210 B2 | 1/2010 | Rhoads | |
| 7,657,058 B2 | 2/2010 | Sharma | |
| 7,685,426 B2 | 3/2010 | Ramos et al. | |
| 7,689,532 B1 | 3/2010 | Levy | |
| 7,693,300 B2 | 4/2010 | Reed et al. | |
| 7,697,719 B2 | 4/2010 | Rhoads | |
| 7,711,143 B2 | 5/2010 | Rhoads | |
| 7,738,673 B2 | 6/2010 | Reed | |
| 7,747,037 B2 | 6/2010 | Hein, III | |
| 7,747,038 B2 | 6/2010 | Rhoads | |
| 7,751,588 B2 | 7/2010 | Rhoads | |
| 7,751,596 B2 | 7/2010 | Rhoads | |
| 7,756,290 B2 | 7/2010 | Rhoads | |
| 7,756,892 B2 | 7/2010 | Levy | |
| 7,760,905 B2 | 7/2010 | Rhoads, III et al. | |
| 7,762,468 B2 | 7/2010 | Jones et al. | |
| 7,787,653 B2 | 8/2010 | Rhoads | |
| 7,792,325 B2 | 9/2010 | Rhoads et al. | |
| 7,822,225 B2 | 10/2010 | Alattar | |
| 7,837,094 B2 | 11/2010 | Rhoads | |

(56) References Cited

U.S. PATENT DOCUMENTS

| | | |
|---|---|---|
| 2001/0021144 A1 | 9/2001 | Oshima et al. |
| 2001/0024510 A1 | 9/2001 | Iwamura |
| 2001/0026377 A1 | 10/2001 | Ikegami |
| 2001/0028727 A1 | 10/2001 | Naito et al. |
| 2001/0034705 A1 | 10/2001 | Rhoads et al. |
| 2001/0047478 A1 | 11/2001 | Mase |
| 2001/0051996 A1 | 12/2001 | Cooper et al. |
| 2001/0053235 A1 | 12/2001 | Sato |
| 2001/0055407 A1 | 12/2001 | Rhoads |
| 2002/0009208 A1 | 1/2002 | Alattar et al. |
| 2002/0015509 A1 | 2/2002 | Nakamura et al. |
| 2002/0021721 A1 | 2/2002 | Jiang et al. |
| 2002/0033844 A1 | 3/2002 | Levy et al. |
| 2002/0067914 A1 | 6/2002 | Schumann et al. |
| 2002/0106192 A1 | 8/2002 | Sako |
| 2002/0112171 A1 | 8/2002 | Ginter et al. |
| 2002/0131076 A1 | 9/2002 | Davis |
| 2002/0150246 A1 | 10/2002 | Ogino |
| 2002/0176003 A1 | 11/2002 | Seder et al. |
| 2002/0186886 A1 | 12/2002 | Rhoads |
| 2002/0196272 A1 | 12/2002 | Ramos et al. |
| 2003/0012548 A1 | 1/2003 | Levy et al. |
| 2003/0040957 A1 | 2/2003 | Rodriguez et al. |
| 2003/0105730 A1 | 6/2003 | Rhoads et al. |
| 2003/0130954 A1 | 7/2003 | Carr et al. |
| 2004/0005093 A1 | 1/2004 | Rhoads |
| 2004/0169581 A1 | 9/2004 | Petrovic |
| 2004/0190750 A1 | 9/2004 | Rodriguez et al. |
| 2004/0240704 A1 | 12/2004 | Reed |
| 2004/0264733 A1 | 12/2004 | Rhoads et al. |
| 2005/0041835 A1 | 2/2005 | Reed et al. |
| 2005/0056700 A1 | 3/2005 | McKinley et al. |
| 2005/0058318 A1 | 3/2005 | Rhoads |
| 2005/0111723 A1 | 5/2005 | Hannigan et al. |
| 2005/0192933 A1 | 9/2005 | Rhoads et al. |
| 2006/0013435 A1 | 1/2006 | Rhoads |
| 2006/0041591 A1 | 2/2006 | Rhoads |
| 2006/0251291 A1 | 11/2006 | Rhoads |
| 2007/0055884 A1 | 3/2007 | Rhoads |
| 2007/0108287 A1 | 5/2007 | Davis et al. |
| 2007/0154064 A1 | 7/2007 | Rhoads et al. |
| 2007/0177761 A1 | 8/2007 | Levy |
| 2007/0183623 A1 | 8/2007 | McKinley et al. |
| 2007/0276841 A1 | 11/2007 | Rhoads et al. |
| 2007/0276928 A1 | 11/2007 | Rhoads et al. |
| 2008/0049971 A1 | 2/2008 | Ramos et al. |
| 2008/0052783 A1 | 2/2008 | Levy |
| 2008/0121728 A1 | 5/2008 | Rodriguez |
| 2008/0133555 A1 | 6/2008 | Rhoads et al. |
| 2008/0215333 A1 | 9/2008 | Tewfik et al. |
| 2008/0292134 A1 | 11/2008 | Sharma et al. |
| 2009/0012944 A1 | 1/2009 | Rodriguez et al. |
| 2009/0116687 A1 | 5/2009 | Rhoads et al. |
| 2009/0125475 A1 | 5/2009 | Rhoads et al. |
| 2009/0138484 A1 | 5/2009 | Ramos et al. |
| 2009/0158318 A1 | 6/2009 | Levy |
| 2009/0232352 A1 | 9/2009 | Carr et al. |
| 2009/0286572 A1 | 11/2009 | Rhoads et al. |
| 2009/0290754 A1 | 11/2009 | Rhoads |
| 2010/0027837 A1 | 2/2010 | Levy et al. |
| 2010/0045816 A1 | 2/2010 | Rhoads |
| 2010/0062819 A1 | 3/2010 | Hannigan et al. |
| 2010/0094639 A1 | 4/2010 | Rhoads |
| 2010/0142749 A1 | 6/2010 | Rhoads et al. |
| 2010/0172540 A1 | 7/2010 | Davis et al. |
| 2010/0198941 A1 | 8/2010 | Rhoads |
| 2010/0306257 A1 | 12/2010 | Levy |
| 2011/0007936 A1 | 1/2011 | Rhoads |
| 2011/0026777 A1 | 2/2011 | Rhoads et al. |

FOREIGN PATENT DOCUMENTS

| | | |
|---|---|---|
| WO | WO9936876 | 7/1999 |
| WO | WO0007356 | 2/2000 |
| WO | WO0031675 | 6/2000 |
| WO | WO0036785 | 6/2000 |
| WO | WO0054453 | 9/2000 |
| WO | WO0207425 | 1/2002 |
| WO | WO0207442 | 1/2002 |

OTHER PUBLICATIONS

U.S. Appl. No. 09/343,101, filed Jun. 29, 1999, Bruce L. Davis, et al.
U.S. Appl. No. 09/413,117, filed Oct. 6, 1999, Geoffrey B. Rhoads.
U.S. Appl. No. 09/482,749, filed Jan. 13, 2000, Geoffrey B. Rhoads.
U.S. Appl. No. 09/507,096, filed Feb. 17, 2000, Geoffrey B. Rhoads, et al.
U.S. Appl. No. 09/538,493, filed Mar. 30, 2000, Geoffrey B. Rhoads.
U.S. Appl. No. 09/552,998, filed Apr. 19, 2000, Tony F. Rodriguez, et al.
U.S. Appl. No. 09/567,405, filed May 8, 2000, Geoffrey B. Rhoads, et al.
U.S. Appl. No. 09/629,649, filed Aug. 1, 2000, J. Scott Carr, et al.
U.S. Appl. No. 09/633,587, filed Aug. 7, 2000, Geoffrey B. Rhoads, et al.
U.S. Appl. No. 09/636,102, filed Aug. 10, 2000, Daniel O. Ramos, et al.
U.S. Appl. No. 09/689,289, filed Oct. 11, 2000, Geoffrey B. Rhoads, et al.
U.S. Appl. No. 09/697,009, filed Oct. 25, 2000, Bruce L. Davis, et al.
U.S. Appl. No. 09/697,015, filed Oct. 25, 2000, Bruce L Davis, et al.
U.S. Appl. No. 12/872,989, filed Aug. 31, 2010, Geoffrey B Rhoads.
U.S. Appl. No. 12/912,461, filed Oct. 26, 2010, Adnan M. Alattar.
U.S. Appl. No. 12/953,190, filed Nov. 23, 2010, Geoffrey B. Rhoads.
Digimarc Information Embedding Technology, Frequently Asked Questions (with Answers), Version 2.0, Sep. 1996.
Restriction Requirement received for U.S. Appl. No. 11/924,914 dated Nov. 24, 2010.
Non-final Office Action received for U.S. Appl. No. 11/924,914 dated Feb. 22, 2011.
Notice of Allowance received for U.S. Appl. No. 11/924,914 dated Jul. 27, 2011.
Examination Report on EP Application 08104558.5, mailed Sep. 8, 2014.

* cited by examiner

DECODING A WATERMARK AND PROCESSING IN RESPONSE THERETO

CROSS-REFERENCE TO RELATED PATENT APPLICATIONS

This application is a Divisional of U.S. application Ser. No. 11/924,914, filed Oct. 26, 2007, incorporated herein by reference in its entirety, which is a Continuation of U.S. application Ser. No. 09/636,102, filed Aug. 10, 2000, incorporated herein by reference in its entirety, which claims priority from Provisional Application U.S. Application 60/191,778, filed Mar. 24, 2000, incorporated herein by reference in its entirety.

TECHNICAL FIELD

The present technology relates to processing of content objects, and arrangements responsive to such objects.

BACKGROUND

In one aspect, the technology detailed below relates to arrangements that take action based on a watermark output and a derived identifier.

In another aspect, the technology relates to arrangements employing a digital watermark detector during a device's boot process.

In another aspect, the technology relates to arrangements employing Application Programming Interfaces (APIs) in conjunction with digital watermarks.

In another aspect, the technology relates to arrangements that take an action with audio or visual information, in accordance with information received in response to a digital watermark decoded from such audio or visual information.

In another aspect, the technology relates to arrangements involving repeated checking of audio or visual content for the presence of digital watermark information.

In another aspect, the technology relates to arrangements that store attribute data relating to digital watermark process of plural content objects.

In another aspect, the technology relates to arrangements for restoring metadata to content objects from which metadata has earlier been lost.

In another aspect, the technology relates to arrangements that modify content objects in accordance with identifiers derived therefrom.

In another aspect, the technology relates to arrangements that identify rendering control instructions by reference to an identifier derived from a content object.

In another aspect, the technology relates to controlling or restricting a content object in accordance with data obtained by reference to an identifier derived from the content object.

In another aspect, the technology relates to content searching arrangements.

In another aspect, the technology relates to arrangements involving delayed responses based on content objects. and In another aspect, the technology relates to file browser systems employing file browser extensions.

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal).

The encoder embeds a watermark by altering the host media signal. The reading component analyzes a suspect signal to detect whether a watermark is present. In applications where the watermark encodes information, the reader extracts this information from the detected watermark.

A great number of particular watermarking techniques are known. The reader is presumed to be familiar with the literature in this field. Particular techniques for embedding and detecting imperceptible watermarks in media signals are detailed in the present assignee's copending application Ser. No. 09/503,881. Other watermarking techniques are known from published patents to NEC (inventor Cox et al), IBM (inventors Morimoto and Braudaway et al), Dice (inventor Cooperman), Philips (inventors Kalker, Linnartz, Talstra, etc. Audio watermarking techniques are known from published patents to Aris (inventor Winograd, Metois, Wolosewicz, etc.), Solana (inventor Lee, Warren, etc.), Dice, AudioTrack, Philips, etc.

Further features of the technology will become apparent with reference to the following detailed description and accompanying drawings.

DETAILED DESCRIPTION

Figure 1:
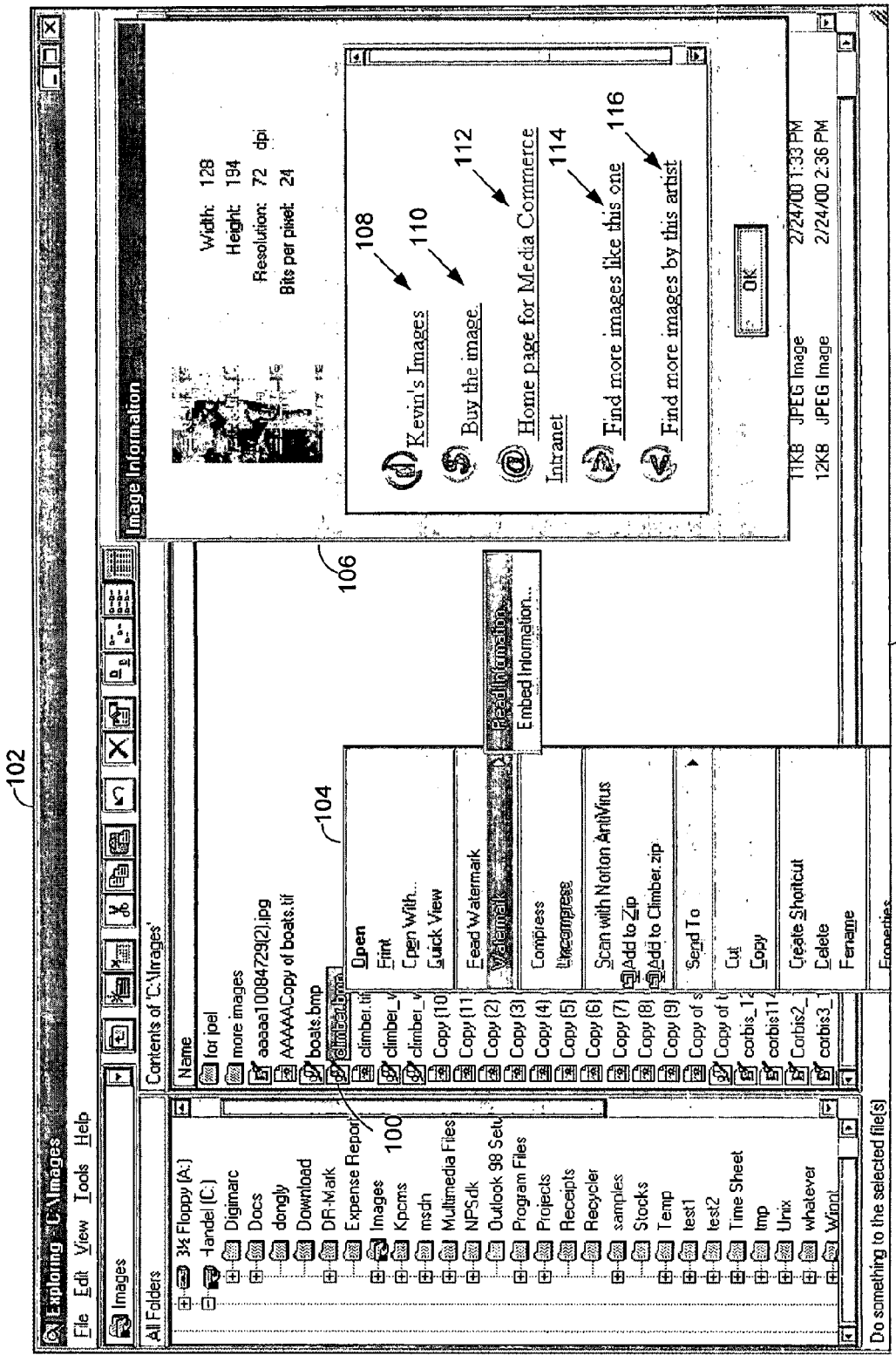
FIG. 1 is an example of user interface features enabled by integrating a watermark decoder in an operating system or other application program.

While the following discussion focuses on content objects linked to respective metadata through use of digital watermarks embedded in the objects, it will be recognized that objects can be linked to metadata via arrangements other than watermarks.

A watermark may be used to associate a media object such as an image, video or audio file to additional information and actions. The watermark can associate the media object with metadata or processing actions encoded within or stored outside the media object. Metadata may be encoded in a watermark message, stored within the media object file, or stored outside the media object file. When metadata is stored outside the media object, the watermark may encode an imperceptible and persistent link to this metadata, such as an object identifier (number, address, index, pointer, etc.) within the media object. Wherever the media object travels, watermark decoder-enabled software or devices can extract the watermark from the media signal, and access the metadata or actions associated with the object via the watermark link.

The specific infrastructure for retrieving metadata or actions associated with a media object via its watermark may vary. The metadata or processing actions may reside in a metadata database in the same device or system as the media object, or in a remote device or system accessible via a wire or wireless network. In a distributed computing environment like the Internet, one way is to implement a database server that takes a object identifier extracted from a watermark message and performs one or more tasks associated with the identifier, such as returning metadata or URL links to a requesting computer or device ("client"), routing the identifier to another server, executing some program or set of programs, etc. The watermark message refers to the auxiliary data encoded into a host media object via the watermark.

The following sections summarize ways to take advantage of this functionality in an operating system, Internet browser, and other applications (whether implemented in hardware devices, software, or a combination of hardware and software).

Integrating a Watermark Decoder in Operating Systems and Other Applications

In Operating System

A watermark decoder may be integrated in a file browser component of an operating system. The decoder enables the file browser to extract a watermark and retrieve metadata for watermark enabled media objects. As the user browses files, the watermark decoder may operate as a foreground or background task, automatically or user-initiated, to detect a watermark. Finding a watermark, the browser annotates its representation of the media object as directed by the application(s) associated with the watermark. Depending on the implementation, the browser may proceed to retrieve additional information or actions associated with the object via the watermark and annotate its representation of the media object accordingly. For example, the browser may annotate the media object with a description of information or actions linked via the watermark (e.g., a brief description and/or http link), or may annotate the object with the actual information or actions.

The process of detecting a watermark and referencing information or actions via the watermark may be implemented to be transparent to the user. For example, the file browser displays information or options obtained via the watermark link without requiring the user to intervene in the watermark detection or information retrieval process.

Alternatively, the file browser can give the user the opportunity to control various stages of watermark detection and processing triggered by the watermark payload. For instance, the user may be given the option to allow the watermark decoder to operate on media objects, and to determine whether and how actions triggered by the watermark payload should proceed. Upon detection of a watermark, for example, the media object can be annotated with an indicator, such as a distinctive sound or logo, that informs the user that information and actions can be accessed via a link embedded in the watermark. The user has the option to access additional information associated with the media object by, for example, selecting a visual logo associated with the object in the user interface. An audio "logo" may be played when the user selects the object (e.g., passes a cursor over its graphical representation in the user interface).

The user interface of the application can be annotated with a variety of graphical and/or audio effects that inform the user of the presence of the watermark link and associated information and actions. Changes in the user interface may be used to convey different stages in the watermark detection and metadata retrieval process. For example, when it first detects the presence of a watermark, the decoder (or host application) plays a generic indicator, such as a simple logo or audio clip. Then, when the appropriate metadata server returns metadata and/or instructions linked via the watermark, the user interface presents specific information associated with the object.

The server may return program code, such as Java Applets, Visual Basic script, XML or some other set of instructions, that present information to the user and provide links to additional information and actions (e.g., URLs or hot links to web sites, other content or program code). Upon receiving this code, a client computer or device executes it. The client typically is the computer or device that decoded the watermark link and issued a request based on the link to the server. This code may perform a variety of functions, including controlling rendering of the watermarked media object and related media objects, some of which may be returned with the linked metadata. The server may return code to control decoding or decrypting the media object or other related media signals to be played along with the watermarked media object. In addition, the server may return code and/or links to enable the user to establish a license and obtain usage rights electronically with a licensing program executing locally and/or on a remote licensing computer (e.g., a licensing server on the Internet).

The server may return data, such as XML, that defines actions to be taken (by providing URLs, instructions, etc.). The client computer or device receiving such a definition of actions may execute the action or present them to the user as options to be executed in response to user input (e.g., clicking on a graphical representation of the option in the user interface of a computer, responding to voice commands via a speech recognition engine, etc.).

The user can access linked information or actions by selecting a graphical representation of the object in a user interface. For example, the user can "click-on" an icon representing the object, or a rendered version of the object (e.g., an image) to determine whether metadata or actions are linked to the object, or to initiate a linked action or retrieval of the metadata.

The watermark decoder may be designed to search for the presence of watermarks in media objects in a specified location (e.g., directories, hard drive, etc.) in response to an event, at periodic intervals, or in response to a user request. For instance, the watermark decoder may be implemented as a utility service, similar to a file search utility, that the user may invoke to a extract watermark link from a media object file, or from a group of files. As another example, the operating system can be designed to invoke the decoder at boot up on all files of a given type in a selected storage location (e.g., on the hard drive). The operating system may also run the decoder as a background utility to periodically check for watermark links in media objects. A timer or clock service may be used to trigger watermark detection when the timer elapses or at pre-determined time intervals. The operating system may also run the decoder when prescribed events happen, such as downloading a file, saving a file, etc. Triggering the decoder in response to such events enables the operating system to ensure that media objects are checked whenever they enter the system or device in which the operating system is executing, and whenever they are edited.

To improve the efficiency of the watermark decoder, the file system may implement a scheme for tracking when and which media objects have been checked for watermarks. One such scheme is to assign attributes to each media object to indicate whether it has been checked, whether or not it is watermarked, and if so, when the watermark was detected. Then, the decoder uses this information to check only media objects that have not been checked or have been modified, or for media objects for which a given period of time has elapsed since the last check. Each time a media object is modified, the attribute indicating that the mark has been checked may be reset to ensure that only new and modified objects are re-checked.

To illustrate the concept, consider an implementation in the Windows Operating System. FIG. 1 illustrates an example of an extension of the Windows Explorer user interface to support watermark embedding and reading of media objects. Media object files are typically represented as icons 100 in the user interface 102 of the Windows Explorer file browser. By right clicking the mouse while positioning a cursor over the file icon 100, the user can access a context menu 104 of options associated with the selected media object.

This "watermark aware" file browser augments the options of the context menu by listing options such as "Read Watermark" or "Watermark." When the user positions the cursor over the "Read Watermark" option, the operating system invokes a watermark decoder on the media object. The watermark decoder extracts the watermark link and acts in concert with network communication software to access the metadata database and retrieve the items from the database associated with the watermark link. The file browser displays these items in a window 106.

There are a variety of ways to access the metadata database. The metadata may be stored locally (in the same machine as the media object), in a local area network or a wide area network. If the database is located on a remote computer on a computer network, such as the Internet, network communication software may be used to establish a connection with the database.

When selected, the "Watermark" option displays further options for reading and embedding information ("Read Information . . . " and "Embed Information . . . "). The window labeled Image Information 106 displays metadata and actions associated with an image via a watermark link embedded in it. In this example, the window 106 displays a thumbnail of the image, image attributes (e.g., width, height, resolution, bits per pixel), and a series of HTML links 108-116 to additional information and actions (such as a search for related images at links 114, 116).

Figure 2:
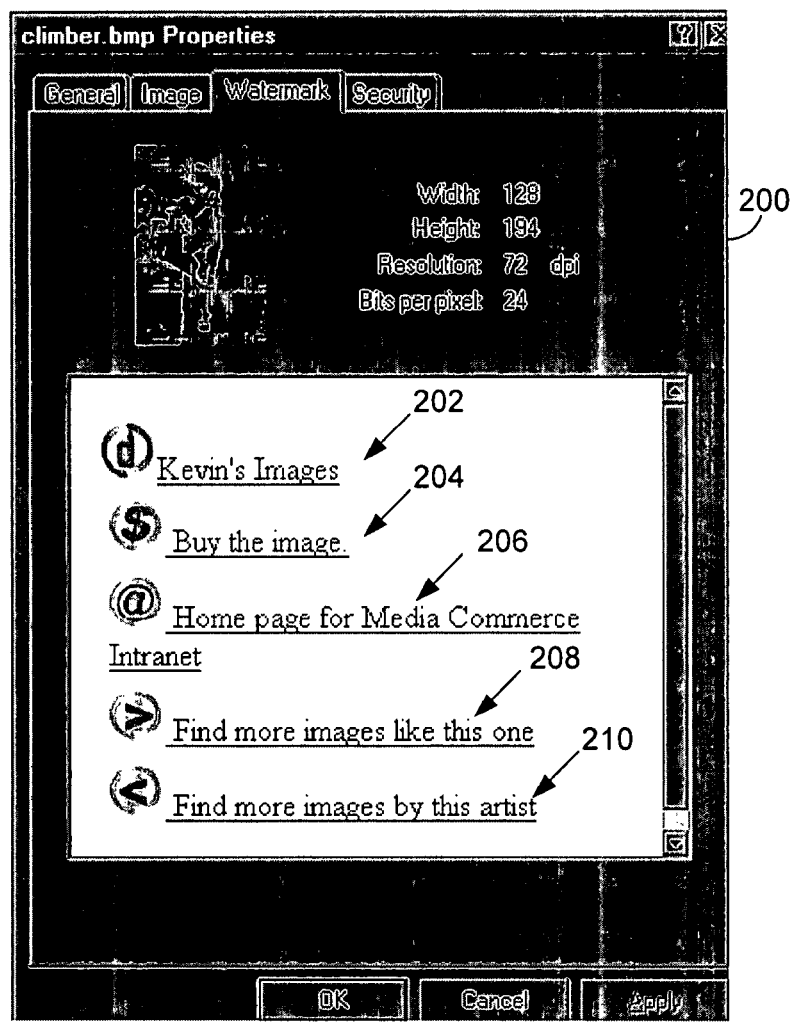
FIG. 2 is an alternative implementation of a user interface for displaying metadata in the file browser of FIG. 1.

Another way to display items linked via a watermark is to insert them in an additional property page as shown in FIG. 2. While executing the file browser, the user accesses properties (option 118 in FIG. 1) by right clicking the mouse while positioning the cursor over the media object's icon. In response to selecting properties, the operating system displays a properties window such as the one shown in FIG. 2. Each of the property pages associated with the media object has a tab (e.g., General, Image, Watermark, Security). The Watermark page is selected in FIG. 2. Like the options displayed in the window 106 of FIG. 1, the Watermark page lists a series of HTML links 202-210 to additional information or actions. When selected, the link invokes an Internet browser to retrieve information at the underlying URL. For actions like searches 208-210, the link may pass additional parameters such as attributes of the media object to the server at the URL, which in turn, executes a search using those parameters and returns the results to the Internet browser.

An additional way to reflect that a file includes watermarked data is to superimpose a graphical "watermark indicator" icon to the file's icon to signify the presence of a watermark in the file.

While the implementation may vary, the examples depicted in FIGS. 1 and 2 are shell extensions of the Windows Explorer file browser. The decoder is implemented as a COM object client of the Windows Explorer. The COM object client is registered with the operating system as a shell extension handler. FIG. 1 depicts a context menu handler, while FIG. 2 depicts a properties page handler.

Another possible implementation is to implement a shell extension that uses a shell execute command to launch a metadata retrieval application that gets and displays metadata options. This implementation adds an extension to the file browser user interface, such as a context menu extension. When the user selects a media file object within the file browser user interface, it displays a context menu with an option to launch the metadata retrieval program associated with media objects of a given type. A number of actions can be tied to this option. One action is to launch the metadata retrieval application program. Another action is to launch a media player to play the selected option. Of course, both actions can be initiated concurrently in a multitasking operating system.

One example of a metadata retrieval application is a watermark decoder that extracts a watermark message, and forwards an object identifier from the message to a metadata server, which then returns metadata. As noted above, the retrieval application need not extract the object identifier from a watermark if it was already extracted and used recently to retrieve metadata. Instead, the retrieval application can proceed to display the metadata and actions to the user.

To launch the retrieval application, the shell execute command passes the name and location of the media object to the retrieval application. The retrieval application may present its own user interface to display linked metadata and actions, or may pass them to the file browser, which then displays them within an extension such as a properties page or context menu extension. The retrieval application may prompt the user to request permission before decoding a watermark or requesting an update of metadata from the metadata server. Additionally, the retrieval application may launch one or more other applications, such as an Internet browser to issue a request for metadata from a Web server and display metadata and actions in an HTML document returned from the server.

The approaches described above can be implemented for a variety of media object files, including image, video and audio files. Also, the object identifier need not be inserted in a watermark, but instead may be placed somewhere else in the media object file, such as a file header.

In Browser

The watermark decoder may also be integrated into an Internet browser application. Like the file browser, an Internet browser can browse directories of files in a local computer or across a network. Commercially available browsers like Internet Explorer from Microsoft Corporation and Netscape Navigator typically support transfer protocols like HTTP and FTP, and have additional components for interpreting or compiling code, including HTML, Java, Visual Basic and scripts (e.g., Java scripts, Visual Basic scripts, etc.). In addition, Internet browsers can parse and render HTML for display in a computer or other device's user interface.

To illustrate integrating a watermark decoder in an Internet browser, consider the following example. As the Internet browser downloads and parses web pages with media objects on the Internet, it keeps a listing of these objects, and checks them for the presence of a watermark. In the listing, it annotates the representation of the objects with watermarks to reflect the presence of the watermark, and potentially other data such as a URL where the media object originated. The user may access the listing by viewing an application window (e.g., an application bar) that presents a visual representation of the media objects. For images, one way to represent the media object is through the use of a thumbnail of the image. Images and other objects may be represented as a graphical icon, textual description, or both.

Watermark objects may be distinguished with a visual or audio indicator like a distinctive sound or logo. The user views the metadata or actions associated with a media object by selecting the representation of the watermark-enabled object in some fashion. For example, the user can click on the thumbnail, icon, logo, or textual description to access a menu of metadata or actions linked to the object via the watermark.

Another way to indicate watermarked objects is to alter the appearance of a cursor in a graphical user interface of the software application when the user passes the cursor over the watermarked object or a representation of the object displayed in the graphical user interface. One way to alter the cursor is to change it from a conventional pointer to a distinctive graphical icon associated with the detected watermarked object type. Another way is to animate the cursor such that it morphs into some other shape or graphical design over a sequence of frames. Similarly, the user interface can alter the appearance of the watermarked object as the user passes the cursor over it. In addition, the user interface can produce a distinctive sound when the user passes the cursor over the object to signify that it includes a watermark.

U.S. patent application Ser. No. 09/165,142 (now U.S. Pat. No. 6,421,070) provides an example of how to decode watermarks from images in HTML pages and annotate the images with a logo indicating that a watermark is present. It describes a way to present a representation of media objects (thumbnails of images) in an application window of a browser. One such application window may be used to display thumbnails of images to present a history of images encountered while browsing web pages on the Internet or elsewhere. The user may click on an image to add it to a separate "bookmark" or "favorites" list. Another application window may be used to display thumbnails of the images in this bookmark list. By selecting an image or a representation of it, the browser links to a network resource associated with the selected image (e.g., via an associated URL). This network resource may be a web page where the image originated. Alternatively, the resource may be a web page referenced via the watermark link embedded in the image. The watermark message may encode a URL or an object identifier that is used to look up a URL of a network resource, such as a web page. For example, the URL might link to the web page of an owner, or to a licensing server.

The methods described in U.S. patent application Ser. No. 09/165,142 may be applied to other media objects like video and audio signals.

Figure 3:
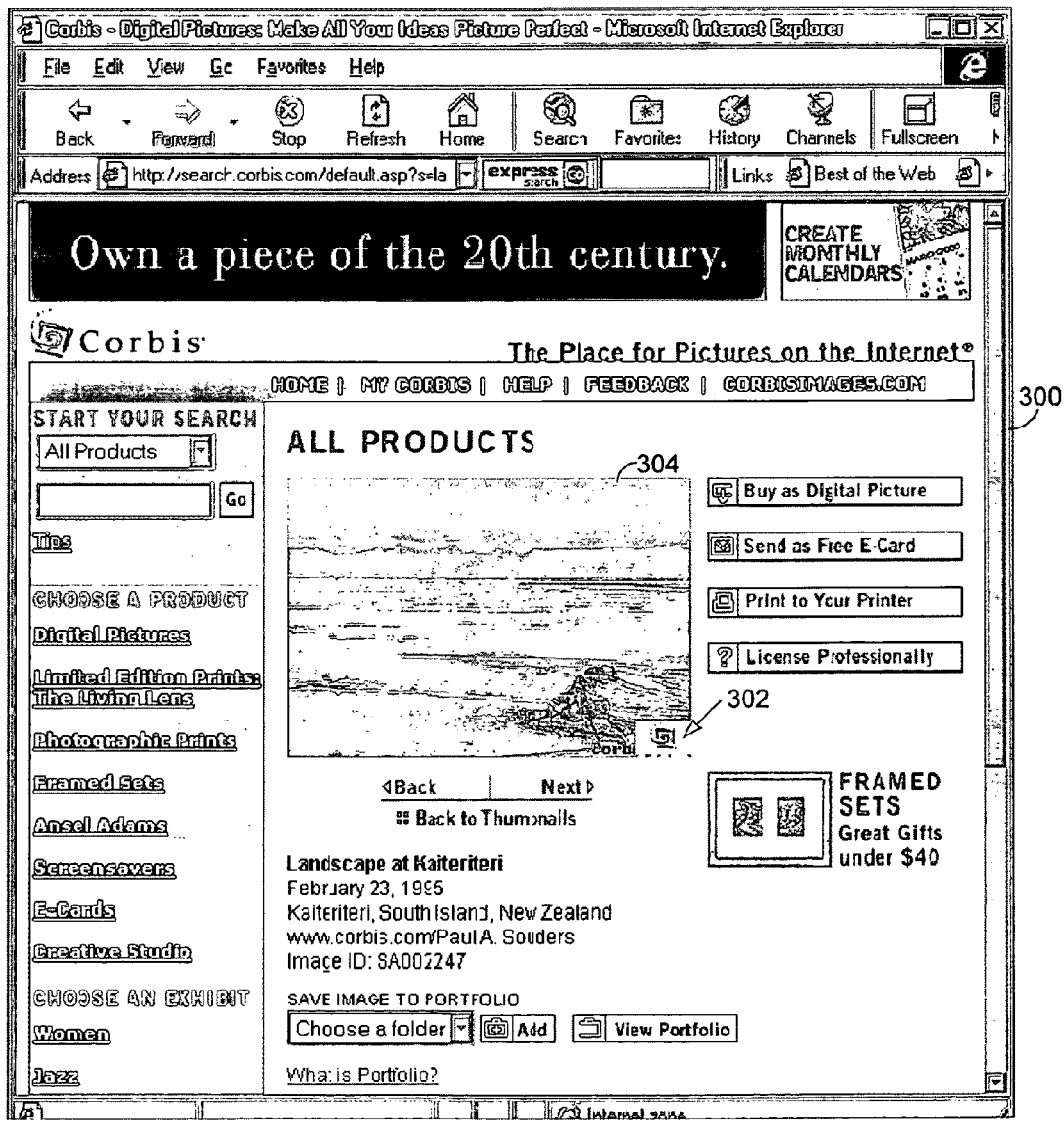
FIG. 3 is an example of user interface features enabled by integrating a watermark decoder in an Internet browser.

One way to allow the user to access metadata and actions linked to a media object via a watermark is to display them in a menu in the user interface of the Internet browser. FIG. 3 shows an example of how to display metadata and actions associated with a media object in the user interface 300 of an Internet browser. A browser listener program receives events from the Internet browser indicating when a web page has been downloaded. The listener requests from the browser the address or addresses of media objects in the web page. The address indicates where the media object resides in memory (main memory, virtual memory, cache, etc.). The listener invokes a watermark decoder on the media object or objects, passing it the address of the object in memory.

Finding a watermark, the listener inserts a handler program into the web page in memory. This handler program is responsible for presenting a logo or other indicator to the user indicating the presence of the watermark and providing hot links to information and actions. For example, the indicator in FIG. 3 is a logo 302 superimposed over a rendered version 304 of a watermarked image object in the browser's user interface.

Figure 4:
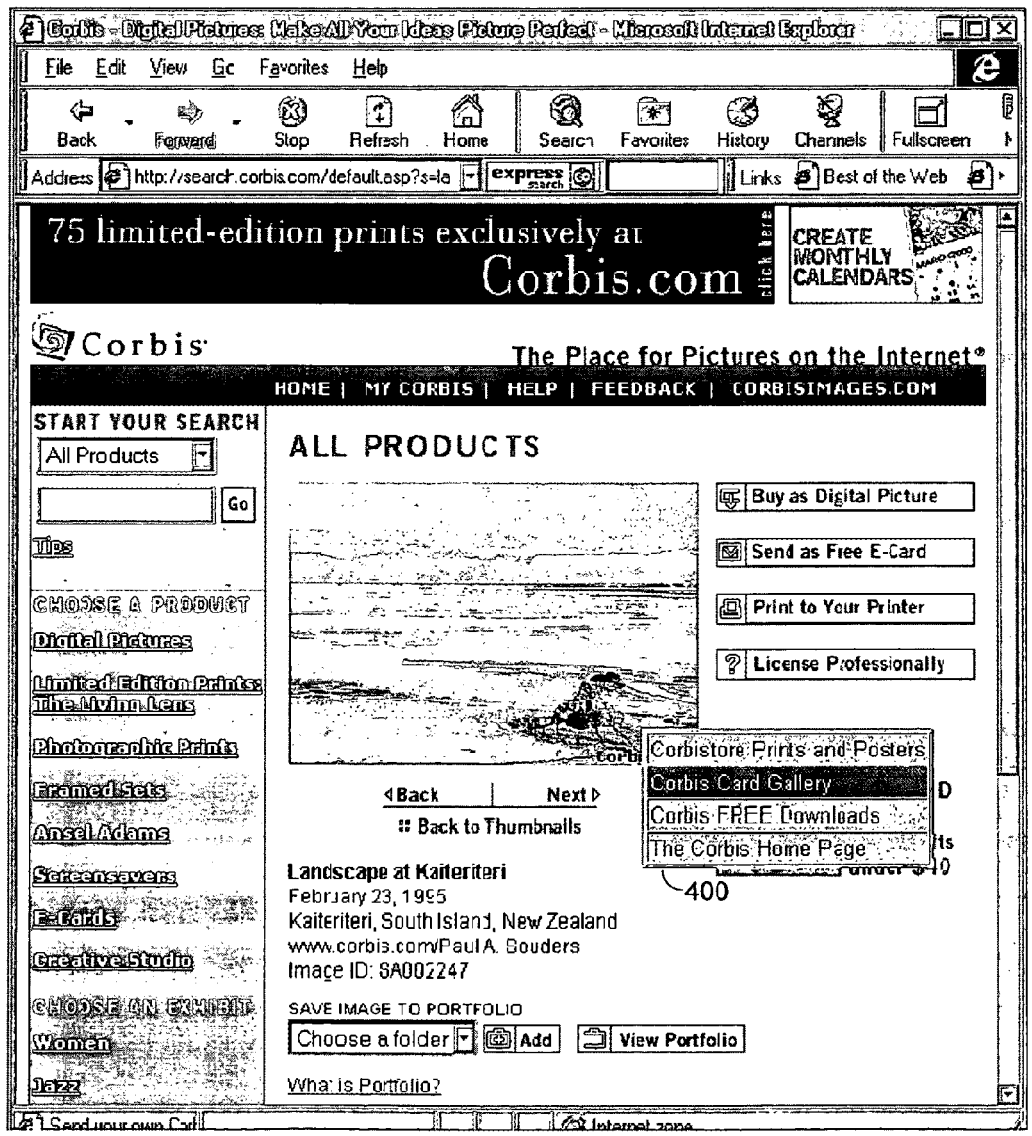
FIG. 4 shows the example of FIG. 3 with an expanded menu of options linked to a media object via a watermark.

When the user passes the cursor over a logo and selects it, the handler program associated with it displays a menu 400 of options as shown in FIG. 4. The listener program retrieves these options by establishing a connection to a metadata server (e.g., a local or remote database), passing an object identifier extracted from the watermark to the server, and receiving associated items from the server. These items may include URL links to web pages related to the media object, information about the media object, or links to an action, such as licensing server.

While specific implementations may vary, the example depicted in FIGS. 3 and 4 is implemented using document view extensions to the Internet Explorer browser from Microsoft Corporation. Microsoft's dynamic HTML provides an interface that allows an Internet Explorer listener program to insert code to modify an HTML document. Using this interface, the listener program inserts a Java script that controls the display and responds to input to the logo superimposed on the image shown in FIG. 3.

In some applications, media content and web site developers may wish to selectively enable or disable functionality associated with a watermark link. One way to implement this feature is to modify the media object file or some other file that acts as a container of a media object (e.g., an HTML) to include a control parameter (like a flag in a header file). This control parameter indicates the presence of a watermark enabled media object and whether the watermark link is enabled or disabled. The control parameter may be designed to default to being active, unless expressly turned off, or vice-versa. When content developers include the object in some multimedia work, such as a website, they can opt to disable the watermark link via the control parameter. Editing tools and other application programs and devices can be designed to turn the flag on unless expressly instructed to disable the watermark link.

In other applications, it is important that the watermark act as a persistent link to associated metadata. As the media object travels through different systems, gets coded/decoded, gets modified, etc., it may lose conventional metadata stored in the media object file. In these cases, the watermark link may be used to restore the metadata because the watermark is robust to various forms of transformations (e.g., digital to analog conversion, analog to digital conversion, compression, etc.).

Another way to selectively control functionality made available via the watermark is to enable the user to enable or disable watermark decoding on media objects.

The watermark can also be used as an attribute to the browser's file cache system. This allows cache browser applications to identify which cached files are watermarked and perform functions associated with the information embedded in the watermark as described throughout this document.

In Other Applications

The features outlined above can be implemented in any software applications or devices that process media objects. For example, a media object database management system may implement similar functionality. Digital asset management and digital rights management systems may use watermark enabled links to track and control the use of media objects.

Other applications that encounter media objects, like Word processing, spreadsheet, presentation programs, media object editing tools, etc. can all use some version of the features outlined above to link media objects with additional information and actions.

Many application programs have file browser capabilities that can be enhanced using the technology described in this document. For example, the File Open command is often used to browse file objects. The context menu and properties page extensions described above can be implemented for applications that provide file browsing services.

Watermark encoding and decoding functions can also be integrated into file sharing systems, such as the peer to peer file sharing systems like Napster, Gnutella, Freenet, Scour, etc. In a file sharing system, file sharing software executes on a number of client computers interconnected on a computer network. This software tracks the files available for sharing in the computer in which it executes, as well as other computers interconnected via the network. File sharing software may use watermarks or other forms of embedded data in files to control file transfers (uploading and downloading files on the computer), verify that a file is complete and free of viruses, carry metadata that may be used to search for files in the file sharing system, carry links to additional information and opportunities to obtain usage rights or to buy intellectual property rights in the file, or related products or services. To access this functionality, the file sharing software includes watermark or other embedded data decoding software. To insert or alter this functionality, the file sharing software includes watermark or other embedded data encoding software. For more information on this application, see U.S. patent application Ser. No. 09/620,019, filed Jul. 20, 2000, and entitled Using Embedded Data with File Sharing which is incorporated by reference above.

Context Sensitive Watermark Links

The actions or information linked to a media object via a watermark may be context sensitive. Some examples of "context" include application context (e.g., referring to the application program that is operating on the object), the object location context (where the object resides relative to the user). For example, the behavior of the link may be different when the user is manipulating the object in an editing tool as opposed to inserting the object in a document, such as a word processing document, a spreadsheet, or presentation. Also, the behavior of the watermark link may change based on whether the object is local, in an intranet, or on the Internet, relative to the user.

The decoder application may link to different metadata or processing actions depending on the context of the media object. To implement this functionality, the watermark decoder provides context information to the metadata database, which in turn, provides context specific metadata or initiates context specific actions. For instance, if the object is being edited with an editing tool, the decoder provides information about the editing tool to the database in addition to the link extracted from the watermark. Similarly, the decoder may provide context information indicating where the object resides relative to the user's computer. Using the context information as a key, the metadata database returns metadata or initiates processing actions that are associated with the context.

Another way to implement the context sensitive behavior is to allow the decoder to control the presentation of watermark-linked actions or information based on the context of the media object. In the case where the context is defined by the application, this approach is akin to giving the application access to all of the linked metadata or actions, and then letting the application control presentation of the linked actions or information to the user. In such a scenario, the metadata database returns at least a descriptor of linked information and actions, and the application chooses which sub-set of the information or actions to apply based on the context. In the case where the context is defined by the location of the object, the decoder operates in a similar fashion. For example, it may choose a sub-set of the linked actions of information based on the location of the object.

A specific example of context information is user information supplied by the user's computer to a web server over the Internet using "cookie" technology. First, the user's computer decodes a watermark from a media object, such as an image, audio, or video signal. It then sends information extracted from the watermark along with a cookie including user information to a metadata server or router (generally referred to as a server). The server operates on user information from a cookie along with information extracted from a watermark in a media object to look up information or actions that are personalized to the user. The metadata server, for example, parses the cookie and uses it to reference information or addresses to network resources (URLs of web pages) in a database that relate to information in the cookie. The server further narrows the pertinent information or links by using the watermark information to look up a subset of information or links that are pertinent to the watermarked object. Then either the server, or another network resource referenced by the database operations returns associated information back to the users computer for rendering on the display or audio output device. This approach can be used to limit the information returned to specific news, advertising, content, etc. that is likely to be of interest to the user. A similar effect can be achieved by programming the user's computer to supply user preferences that are used in a similar manner as the cookie information.

Supporting Multiple Watermark Types

As watermark technology proliferates, media objects may have different types of watermarks, each associated with a set of watermark encoders and decoders. To accommodate different watermark types, the decoder can be designed to support different watermark protocols. The watermark protocols provide keys and other parameters specifying how to decode a watermark of a given type. Alternatively, a common Application Programming Interface (API) can be specified for different core watermark encoder and decoder software modules or devices. These schemes facilitate the development of many different types of applications and devices that invoke watermark encoder and decoder functions, yet are independent of the watermark protocol and/or core watermark methods.

To support different core watermark methods, the user may install two or more different core watermark encoder/decoder modules. For example, the core modules may be implemented as plug-ins or dynamic link libraries. When installing a module, the installation process updates a registry, such as the registry in the Windows Operating System, to reflect that a watermark type is supported. In this manner, watermark decoders for different media types, and different types of decoders for a single media type may be supported.

In cases where a media object contains a watermark of unknown type, the media object file may specify the watermark type, e.g., through a parameter in a file header. The file browser, or other client of the core watermark module, may invoke the appropriate decoder by extracting the type parameter from the media object and passing it and a reference to the media object to the core module via the API. The API routes the request to the appropriate core module, which in turn, extracts the watermark message, and returns it to the API. The API passes the message to the requesting application.

In the event that a type parameter is not available, the application or device processing the object may enumerate through all supported watermarking protocols to check if any protocol is present. The watermark protocols for given media or file type may be registered in the device or application (e.g., in a registry of the operating system). To check for each one, the application invokes a watermark screening process for these protocols to determine whether a watermark associated with the protocols is present.

Media Object Branding

The watermark can be used to establish "branding" in addition to facilitating electronic access to other services. In such a branding application, a watermark decoder enabled application or device in a client reads the embedded watermark message from the object and use it to access a digital logo, such as a thumbnail image (e.g., a brand "brand image"). The decoder-enabled application sends an object identifier taken from the watermark message to a server (such as a metadata server on the Internet), which, in response, returns the logo. The application then renders the logo, preferably superimposed on a rendered version of the media object or a graphical representation of it in the user interface of a client computer or device.

In some scenarios, the server also returns an address (e.g., URL) pointing to either a generic "usage rights" server or a custom "usage rights" maintained by the media owner. In an Internet context, the server may return one or more links to related Web sites. Connection rights and corporate branding services may be provided via a central server on the Internet.

Using the object identifier to link to actions and metadata, watermark enabled applications have many options to extend the branding and usage rights services. An application could display "updatable" usage rights associated with the object identifier. In visual media objects, the application may display the branding logo visually superimposed over a portion of the rendered object (e.g., in a corner of a video frame, periodically for a predetermined period of time) or displayed as a splash screen initiation before playback of the media object begins. To make the branding information less obtrusive, it may be accessible upon request through a menu (e.g., when the user clicks on a representation of the object or "help" menu).

The branding service transforms the notion of copyright notification into a substantial ever-present branding opportunity with additional functionality, such as a hot link to the home page of the content owner or to a licensing server. The branding service may be combined with other watermark enabled functionality, such as a copy management instruction in the watermark payload, e.g., a control parameter indicating whether the object may be played, copied (number of copies allowed), recorded, transferred into other device or system, etc. In addition to providing this instruction to control usage, the watermark payload provides additional value to the consumer (e g , linking to additional information and services associated with a media object) and ensures that the media object is well labeled and branded during playback.

More elaborate hot branding links, usage rights services, and context-sensitive linking may be added by associating the watermark link with software programs, metadata, and pointers to programs and metadata that support these features. These features may be added in the metadata server by adding them to the list of actions and/or metadata to be executed or returned in response to receiving the media object identifier. In addition, the decoder enabled application may be programmed to send the media object identifier to two or more servers that provide different sets of services or metadata for the object identifier.

Aggregating Metadata

In some applications, a media object may be associated with metadata from two or more different sources. The metadata may be stored in a file that stores the media object. For instance, file formats like JPEG2000, TIFF, JPEG, PSD may allow metadata to be stored along with the media signal (e.g., an image). Metadata and instructions associated with a media object may be stored in the same device as the media object, or in a remote device (e.g., a remote database). In these types of applications, decoders may be programmed to extract metadata from each of the different sources. The media type of file type may signal to the decoder to extract metadata from these different sources. Alternatively, the watermark message or file metadata may enumerate the different sources of the metadata.

In these applications, the decoder may be designed to get metadata from one or more sources and then present an aggregate of all information. The decoder may perform an aggregation function automatically or prompt the user to select desired sources of metadata for display.

Additional Functionality

A number of features can be implemented that take advantage of the watermark message payload and watermark links to other data and actions. Several examples are highlighted below:

Metadata

Metadata can be expressed in many forms and provide additional functionality. In general, metadata is information about the media object. It may also include machine instructions to be executed, or a reference to information or instructions (object, user, program, or machine identifiers, URLs, pointers, addresses, indices or keys to a database, etc.). The machine instructions may, for example, control rendering, decoding, decrypting or other processing of the object. Alternatively, the instructions may provide some ancillary functionality.

One important application of metadata is to provide ownership information. Another is to provide licensing terms and usage rights.

The metadata can be used to describe attributes of the media object that the user or other applications may use. For example, one attribute may designate the content as restricted, which prevents an application from rendering the content for unauthorized users. Another attribute may designate the object as commercial, which requires an application to seek payment or a license before the object is rendered.

Multiple Watermarks

The media object may contain two or more watermarks or watermark messages, each associated with a distinct set of information or actions. For example, the media object may contain a creator ID, a distributor ID, etc. that link to information about the creator and distributor, respectively.

There are a number of ways to add watermarks to a media object, either at object creation time, or later as the object is transferred, copied, or edited. One way is to interleave separate watermarks in different portions of the media object. This can be accomplished by modifying independent attributes of the media object. Independent, in this context, means that each watermark does not interfere with the detection of the other watermarks. While two independent watermarks may alter the same discrete sample of a media object, they do so in a manner that does not cause an invalid read of any of the watermarks.

Independent watermarks may be located in different spatial or temporal locations of the host media signal (e.g., image, video, audio, graphical model, etc.). The may also be located at different frequency bands or coefficients. Also, they may be made independent by modulating independent features of the signal, such as phase, energy, power, etc. of different portions of the signal.

To illustrate the concept, consider an example of a still image object. Each independent watermark may be defined through a different protocol, which is used to encode a different watermark message (e.g., different watermark links for a creator, distributor, user, etc. of the media object). Independent spatial watermarks may be interleaved by mapping each of the watermarks to a unique set of spatial locations in the image.

In a similar fashion independent watermarks may be encoded in a temporal data sequence, like audio or video, by mapping each watermark to unique temporal locations.

Digital Rights Management

The watermark may be linked to information and processing actions that control use of the media object. For example, the metadata may indicate the owner of the intellectual property rights in the object as well as licensing terms and conditions. Further, the watermark link or metadata trigger processing actions that control use of the object, such as requiring the user to submit payment, and exchanging decoding keys (e.g., decryption, decompression, etc.). While some amount of decoding of the object may be required to extract the watermark, the remainder of the content may remain encoded and/or encrypted until the user obtains appropriate usage rights.

The digital rights management functionality can be implemented in a licensing or usage rights server, such as the metadata server. This server determines the owner and licensing terms based on the watermark message and executes actions required to authorize use of the object, e.g., electronically receiving payment information from the user, establishing and recording a user's assent to the license, forwarding transaction details to the owner, and returning a usage key to the user. As the user plays or renders the media object, the watermark decoder can send a message to the server to log information about the usage, such as instances of use, machine ID of the player, time of use, etc.

Watermark and Context Information for Usage Control

Watermark decoders can also use context information along with information extracted from a watermark embedded in a media object to control use of that object. For example, the watermark decoder may be programmed to control the rendering, editing, copying or transfer of a media object depending on control data in the watermark and context information derived from the device or system in which the object resides. For example, the watermark may instruct the decoder to inhibit rendering of a media object if its outside of a given file (e.g., a specified web page, computer system, computer network, etc.). After decoding the watermark including such control data, the decoder determines the pertinent context information that must be present to enable a particular operation. This may encompass such actions as verifying the presence of a user identifier, computer identifier, file identifier, storage media identifier, computer identifier, network identifier, etc. before enabling the operation. These identifiers are stored in association with the entities that they identify, or are dynamically derived from these entities. For example, a file identifier can be stored in a file header or footer, or derived from content in the file. A storage device identifier can be stored on the storage device, or derived from content on the storage device or some attribute of it.

This context sensitive control of media objects is particularly useful in controlling the use of media files like music and movies, but applies to other types of media signals in which watermarks can be encoded. For instance, such context sensitive control can be used to prohibit rendering, copying or transfer of a media object when it is removed from the context of a web page, a computer, a storage device (e.g., a CD or DVD), file sharing network, computers of paid subscribers of a subscription service, a collection of related media objects, etc.

Asset Management

The watermark embedded in a media object may play a role in asset management. Every time the object is processed (opened, edited, copied, etc.) an application equipped with a decoder can log information about the processing event. Alternatively, it can send a transaction event to a monitoring server via the Internet. The transaction event may specify information about the object, such as its ID, the user's ID, the time and location of use, the nature of the use (number of playbacks). The monitoring server or application records this transaction event in a database and, upon request, generates reports about the use of a given object, or by a given entity. Any of the fields of the transaction record can be used to query the database and generate custom reports.

Integration with Directory Services

Directory services like the Lightweight Directory Access Protocol (LDAP) can use the watermark or operate in conjunction with the watermark decoder to provide additional functionality. LDAP is an on-the-wire protocol used to perform directory operations such as read, search, add, and remove.

For example, an LDAP service can be used to determine when to extract the watermark link and update attributes of a media object. For example, the LDAP service may control periodic updates of the media object's attributes by invoking a watermark decoder and retrieving an update of its attributes from a metadata server at predetermined times. An LDAP search filter that includes or accesses a watermark decoder can also be provided to find watermarked media signals in files stored in file directories on computers.

Media Object Player and Delivery Integration

A watermark decoder may be integrated with software and devices for playing or editing media objects. There are a variety of commercially available players from Liquid Audio, Microsoft, and RealNetworks, to name a few. Such integration allows metadata and actions linked to the media object to be accessible to the user in a seamless fashion through the user interface of the player. For example, when a user is playing a video or audio file, a watermark enabled player may access and display linked metadata or actions automatically or at the user's selection. In either case, the user need not be aware that metadata or actions are obtained from a remote server via an object identifier. Also, such integration enables a content owner to link an object to licensing or assert usage control information or actions at playback time, whenever and wherever the object is played. Such information and actions can be implemented by placing data or instructions in a watermark within the object, or putting an object identifier in the watermark that links to metadata or actions outside the object as detailed throughout this document.

In many cases, it is desirable to access the functionality provided via the watermark transparently to the user. As such, the media player can be enhanced to display items linked via the watermark in a manner that appears to be a natural extension of the user interface. When the user or other program invokes the media player to play an object, it displays metadata or actions provided within or linked via the watermark in an extension of the media player's user interface.

These metadata or actions may be retrieved when the media player is launched or at some other time (e.g., as a background task, in response to user request, when the object is loaded to the computer or device where the media player resides, etc.). In one scenario, the media player invokes a watermark decoder on an object in response to a user's request to play the object. In this scenario, the media player passes the address of the object to the watermark decoder, which in turn, attempts to decode a watermark embedded in it. Upon locating a watermark, the decoder forwards an object identifier extracted from it to a metadata server, which returns metadata or actions associated with the object identifier. During metadata retrieval, the media player proceeds to play the media object. When the linked metadata arrives, the extension to the media player displays returned metadata or actions.

Figure 5:
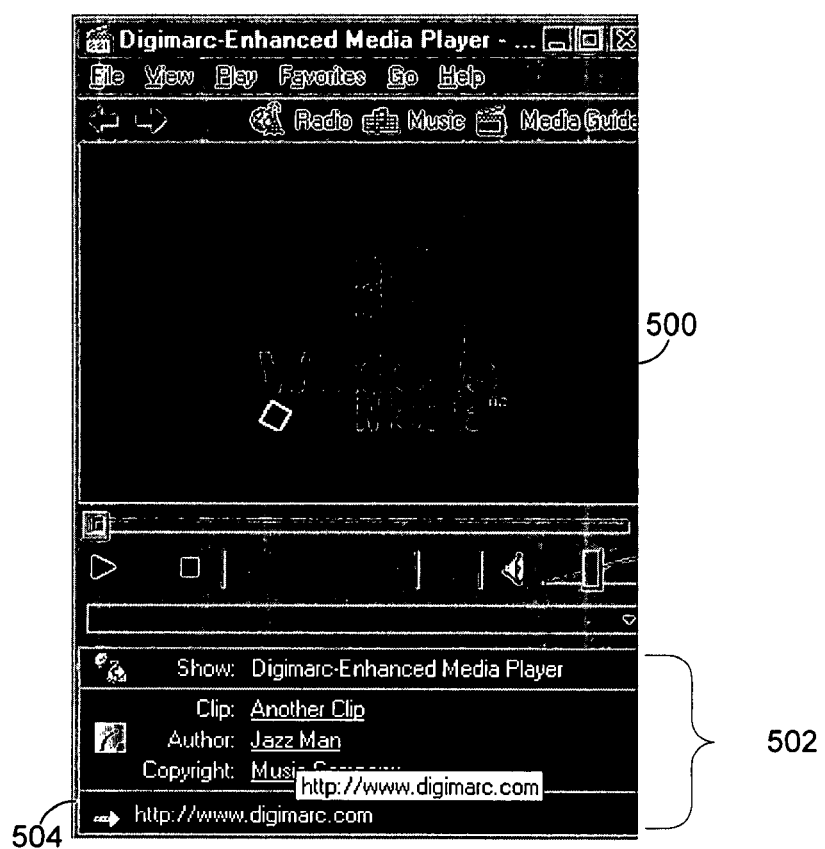
FIG. 5 is an example of user interface features enabled by integrating a watermark decoder in a media player.

FIG. 5 illustrates an example of an enhanced version of Microsoft's Windows Media player showing metadata and actions. In this example, the user interface window of the player is expanded in a bottom section 502 to show metadata and links associated with a media object. When the user positions the cursor over the items, "Clip," "Author," or "Copyright, the bottom tab 504 displays a URL associated with that item. By clicking on one of the items, the player invokes an Internet Browser, which sends a query to the resource at the selected URL (e.g., request an HTTP request to download an HTML document).

The watermark decoder may be invoked by another application, which launches the media player. Consider a case where a user is browsing audio or video files, either with a file browser or Internet browser. After finding a desired media object for playback, the user selects the object for playback. For example, the user could select a "Play" option via a context menu of the Windows Explorer, or via an insert in an HTML document as explained above. In the first case, a shell extension invokes the watermark decoder to get the associated metadata and executes a program (e.g., COM object, script, etc.) that runs the media player and displays the additional metadata linked via a watermark. In the second case, a Java script or other insert in the HTML document invokes the decoder and starts a program that runs the media player in a similar fashion.

One way to implement a program to control the Windows Media player is through the use of an Advanced Streaming Redirector (ASX) file. The file contains a script that launches the player and displays the metadata (e.g., URL links and information about the object) linked via the watermark. For information about ASX files and the use of these files to control Windows Media Player, see Microsoft's Developer's Network.

Content Authoring Tools

Media content authoring tools, including web page design tools, may include watermark embedding functionality to embed watermarks into content, such as web page content. This embedded data then signals watermark decoder enabled devices and software to perform functions associated with the embedded watermark data.

Such tools may also include watermark decoding functionality to enable content developers to use the watermark decoding feature to screen media object for watermarks within the content authoring environment. If the watermark within a media object being edited conveys information (e.g., copyright owner information, licensing terms, etc.), then the authoring tool can convey this information to the user. If the watermark includes usage control information, then the authoring tool can control the use of the media object based on that information. For example, the watermark in a media object may convey an instruction that inhibits the authoring tool from editing the media object, unless the user obtains authorization from a licensing server.

Web Server Integration and Related Applications

Watermark encoding and decoding functions may also be integrated into network server application software to support functionality described in this document as well additional functionality. In particular, watermark encoding and decoding can be integrated into web servers.

Watermark encoders can be integrated into web servers to embed watermarks in media content transferred to, from or through the server. One reason for embedding watermarks at the server is to encode transaction specific information into a media object at the time of its transfer to, from or through the server. The transaction specific information relates to an electronic transaction between the server and some other computer. For example, before downloading or uploading a media object file, the server may embed information about the recipient/sender of the file into the media signal in the file (e.g., image, audio or video file). Since the watermark remains in the signal, information about the sender/recipient in the watermark remains with the media signal in the file through digital to analog -analog to digital conversion, file format changes, etc.

The server may embed a link to information or actions (links to related web sites) in the file that is uniquely tailored to the sender's/recipient's preferences. The preferences may be obtained from the user's computer, such as through popular "cookie" technology commonly used in Internet browsers, or may reside in some other database that associates a user (a user identifier or an identifier of the user's computer) with the user's preferences (e.g., types of content preferences like news, financial information, sports, e-commerce opportunities, etc.). In this case, the server obtains the user identifier and then queries the database for the associated preferences.

The server may also use the preferences obtained in this manner to control what forms of advertising is returned or linked with the file. For example, the user may request the server to download a desired audio, video, or image file. In response, the server gets the user's preferences and downloads the requested file along with advertising information and web site links that match the user's preferences. The advertising information and links can be referenced by embedding a watermark that includes an address of the information, or that includes an index to a database entry that stores the information and/or links to other information, web sites, etc. The user's computer receiving the file downloaded from the server then renders the file and other related advertising information (e.g., provided in HTML, XML or some other conventional data format) from the server or some other server linked to the file via a watermark in the file.

The server may also embed usage control information into a watermark in a media file based on usage control rights requested by and paid for by the user in an electronic transaction between the server and the user's computer. These usage control rights can then be decoded by other applications and used to control rendering of the file, copying, recording, transfer, etc.

Network servers may also include watermark decoding functionality, such as software for decoding watermarks from media signals in files that are transferred to, from, or through the server. This enables the server to perform the many watermark-enabled functions described or incorporated into this document as well as to provide enhanced functionality. For example, the watermark may include usage control data that the server extracts and acts upon. Examples of usage control data include content rating information (adult content indicators), copy or transfer control information, rendering control information, compression/decompression control information, encryption/decryption control information, links to external information or actions, etc.

After extracting this data from the watermark, the server can modify the file based on the extracted data. For example, the server may compress or encrypt the file in a manner specified in the watermark before transferring the file. The user at the computer receiving the file would then need to have a compatible decompression or decryption program or device to render the media object in the file.

In addition to, or as an alternative to modifying the file based on the extracted watermark data, the server can send related information or instructions to the receiving computer that controls of facilitates usage of the file. For example, if the server determined from the watermark that the content was marked as "adult content", then it could send additional information with the file (e.g., HTTP header information along with a web page including watermarked content) to instruct rendering software, such as the browser, how to render the watermarked content. The rendering software on the receiving computer can then decide how to render the content. For example, if a child is logged onto the computer receiving the file, then the rendering software can opt not to render content in the file marked as "adult content." As another example, the server may decode a watermark that instructs it to send decryption or decompression keys to the rendering software to enable the receiving computer to decrypt or decompress the content. Public key encryption schemes can be used to perform key exchanges between the sending and receiving computers. As another example, the server may decode a watermark that instructs it to send additional data along with the watermarked file including links to web sites based on information that the server decoded from the watermark.

Content Filtering and Counting

Watermark decoders can be used in computers and computer networks to filter watermarked media objects and to count instances of watermarked media objects. Filtering refers to the use of the watermark decoder to decode watermarks from objects that reside in a particular location and control their use, transfer or rendering in response to control data in the watermark, and optionally, in response to additional context data outside the watermark. These media objects may be temporarily stored at the location of the filter, as in case of a device or computer responsible for transferring the media object. Examples of such systems are e-mail servers, firewalls, routers, or gateways in computer networks that use watermark decoding to control the transfer of certain media objects to other devices or computers based at least in part on watermarks found in the objects. The media objects may also be stored at the location of a filter on a more permanent basis. For example, the filter may be used to screen media objects that a user downloads to or uploads from a mass storage device such as a hard drive or remote personal library of music, image and movie files on a mass storage device accessible via the Internet. The filter may be used to inhibit downloading or uploading from the mass storage device in response to a watermark in a file being transferred, or alternatively, may be used to control rendering of the file.

Object counting refers to a way of logging the number of times a watermark media object is encountered, either by filtering media objects that pass through a particular device or system like a firewall or e-mail gateway, or by actively searching a network of systems like the Internet and screening for watermarked media objects found and downloaded as a result of the search. The logs maintained by watermark decoding systems can be adapted to include additional information about the object, including information from the watermark, such as an owner, user or transaction identifier, tracer data, and information about the object, such as where it was found, how it was being used, who was using it, etc. Tracer data includes data that is embedded in the file in response to some event, such as detecting unauthorized use, copying or transfer of the file.

The watermark decoder may be further augmented to send the log electronically to another device or computer in response to a specific request or in response to events. For example, the decoder can be programmed to send a report to a central database on another computer when the number of watermarked objects encountered has exceeded a threshold, and/or when certain information is found in a watermark, such as a particular identifier or tracer data that was embedded in the media object in response to detecting an unauthorized use or copying of it. Programmatic rules can be established within the decoder to specify the conditions under which watermarked media objects are filtered and counted, to specify which information is logged, and to specify when the logged information is transmitted to another computer.

The watermark based filtering and counting functions can be implemented in a variety of software applications and devices. Some examples include a network firewall, and other client, server, or peer-to-peer software applications that encounter media objects (such as operating systems, media players, e-mail readers and servers, Internet browsers, file sharing software, file manager software, etc.). One particular use of watermark based filtering, screening and counting is to monitor watermarked content sent in or as an attachment to e-mails sent between computers.

Watermark Based Spiders

Prior patent documents by the assignee of this patent application describe systems and methods of automated searching and watermark screening of media object files on computer networks like the Internet. See U.S. Pat. No. 5,862,260, which is hereby incorporated by reference. The software used to perform automated searching and compiling of Internet content or links is sometimes referred to as a web crawler or spider.

As extension of the watermark based information retrieval described in U.S. Pat. No. 5,862,260 and marketed by Digimarc Corporation, watermark decoders can be employed in a distributed fashion to perform watermark screening and counting of watermarked media objects on networks, including the Internet. In particular, watermark decoders can be deployed at a variety of locations on a computer network such as the Internet, including in Internet search engines that screen media objects gathered by each search engine, network firewalls that screen media objects that are encountered at the firewall, in local area networks and databases where spiders do not typically reach, in content filters, etc. Each of these distributed decoders acts as a spider thread that logs watermark information as described in this document and those incorporated by reference. Examples of the types of information include identifiers decoded from watermarks in watermarked media objects, media object counts, addresses of the location of the media objects (where they were found), and other context information (e.g., how the object was being used, who was using it, etc.). The spider threads, in turn, send their logs or reports to a central spider program that compiles them and aggregates the information into fields of a searchable database.

Event Scheduling Based on Embedded Data

Watermark decoding may be used in conjunction with an event scheduler to schedule programmatic events that occur in response to decoding a watermark message of a given type. Throughout this document, there are many instances of triggering actions in response to decoding information, instructions, or links from a watermark message. In some cases, these actions are programmatic actions made by software in response to the watermark, while in other cases, these actions are device actions made by hardware circuitry, such as in the case of usage control of media signals in hardware implementations of audio and video players, recorders, etc.

Rather than taking an action immediately upon decoding a watermark message, an event scheduler can be used to schedule programmatic or device actions to occur at a later event, either at a specified time according to a clock or timer, or in response to a subsequent input, action, etc.

One example of this is to schedule a link to a web site to be activated at later, and perhaps periodic events. For example, a watermark decoder implemented in a browser, operating system, media player or other software application decodes a watermark from a media object that links the object to one or more web sites. In response to decoding the watermark, the decoder schedules programmatic actions to occur at later times. Some examples of these actions include: displaying a window with a link to a specified web site at periodic intervals or in response to a programmatic action like the launching of a browser, media player or other application. This approach can be used to prompt the user to buy a product, such as the media object (a music or video track) or some product depicted in the media object. Using this approach, many actions can be scheduled to occur in response to a single decoding of the watermark.

Integrating a Watermark Encoder in Operating Systems and Other Applications

In some applications, it will be useful to encode a watermark or overlay one or more additional watermarks to perform any of the functions mentioned above (e.g., to track uses, refresh usage rights, add links to additional information and actions, etc.). Watermark encoding functionality could be added to an operating system, Internet browser, or other applications. For instance, through a drag and drop procedure, a user could embed a watermark in a media object as a means of enabling the various functions outlined above.

As another example, a watermark encoder may be integrated in a file browser, Internet browser, media player, or other application using the same integration techniques outlined above for the decoder. FIG. 1, for example, shows watermark encoder functionality integrated into the Windows Explorer file browser via a shell extension. In particular, the watermark encoder is implemented as a shell extension handler. This handler is registered as a context menu extension in the registry of the Windows Operating system. As an alternative, it could be implemented as a properties page extension handler.

Figure 6:
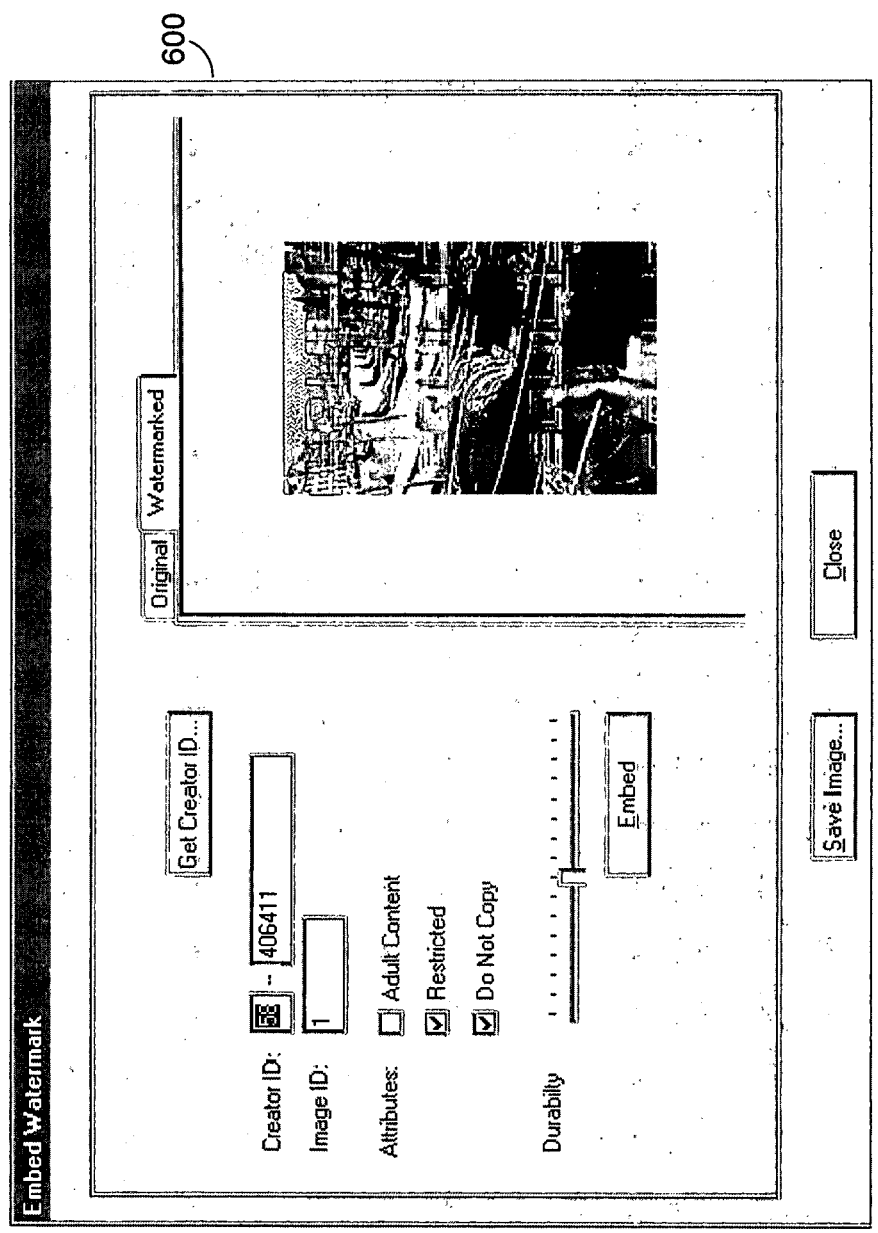
FIG. 6 is an example of a user interface features enabled by integrating a watermark encoder in an operating system or other application program.

To access the watermark encoder in the FIG. 1 example, the user right clicks on a media object, and selects the context menu option called "Embed Information." In response, the handler displays the window 600 shown in FIG. 6. This window enables the user to enter various Ids (e.g., a creator ID, image ID), which are encoded into an image via a watermark.

The user may also set or select attributes of the image object. Finally, the user can control the embedding process by adjusting the durability of the watermark through a scroll bar control. The user can compare the original and watermarked versions of the object by selecting the "Original" and "Watermarked" tabs. When satisfied, the user can save the watermarked image and exit the window (e.g., by selecting close). Metadata and actions may be associated with the image object by forwarding them to the metadata server, which associates them with an object ID.

While the example in FIG. 6 depicts a still image object, a similar approach may be used to embed watermarks in other media objects, such as video and audio objects. To compare marked and unmarked audio or video objects, the shell extension may be designed to launch a media player to play the marked and unmarked objects as desired.

Operating Environment for Computer Implementations

Figure 7:
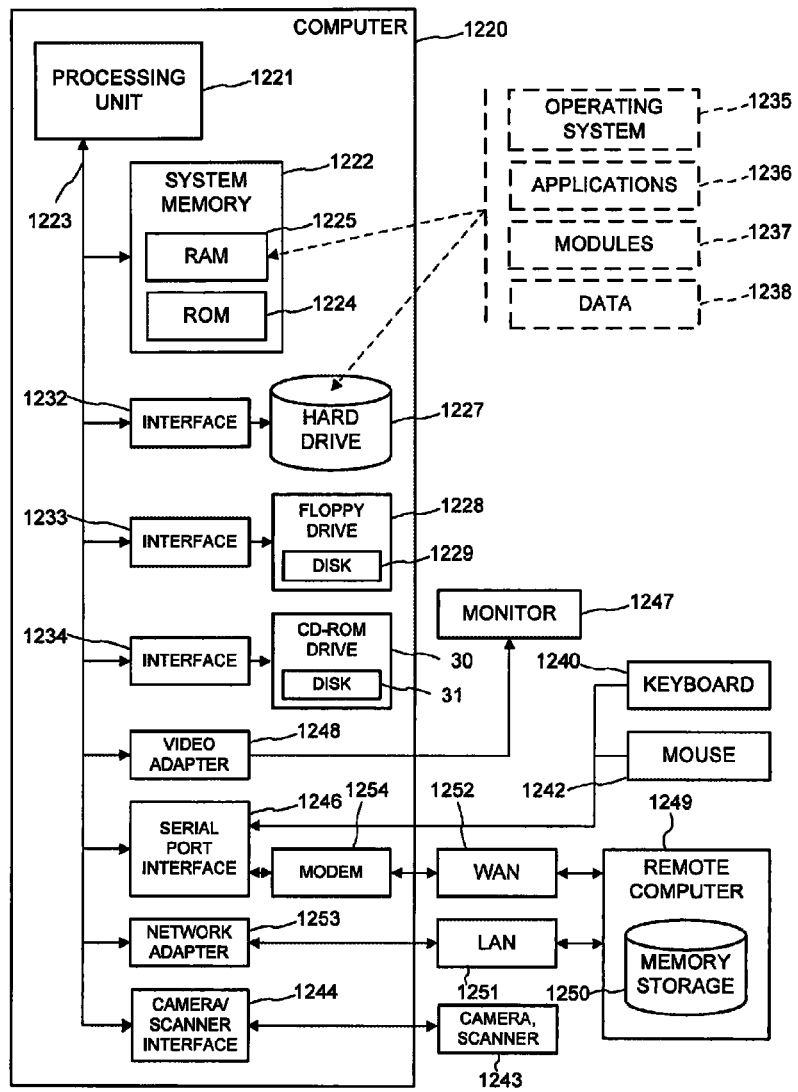
FIG. 7 is a diagram of a computer system that serves as an operating environment for software implementations of watermark encoder/decoder enabled applications.

FIG. 7 illustrates an example of a computer system that serves as an operating environment for software implementations of the watermarking systems described above. The embedder and detector implementations are implemented in C/C++ and are portable to many different computer systems. FIG. 7 generally depicts one such system.

The computer system shown in FIG. 7 includes a computer 1220, including a processing unit 1221, a system memory 1222, and a system bus 1223 that interconnects various system components including the system memory to the processing unit 1221.

The system bus may comprise any of several types of bus structures including a memory bus or memory controller, a peripheral bus, and a local bus using a bus architecture such as PCI, VESA, Microchannel (MCA), ISA and EISA, to name a few.

The system memory includes read only memory (ROM) 1224 and random access memory (RAM) 1225. A basic input/output system 1226 (BIOS), containing the basic routines that help to transfer information between elements within the computer 1220, such as during start-up, is stored in ROM 1224.

The computer 1220 further includes a hard disk drive 1227, a magnetic disk drive 1228, e.g., to read from or write to a removable disk 1229, and an optical disk drive 1230, e.g., for reading a CD-ROM or DVD disk 1231 or to read from or write to other optical media. The hard disk drive 1227, magnetic disk drive 1228, and optical disk drive 1230 are connected to the system bus 1223 by a hard disk drive interface 1232, a magnetic disk drive interface 1233, and an optical drive interface 1234, respectively. The drives and their associated computer-readable media provide nonvolatile storage of data, data structures, computer-executable instructions (program code such as dynamic link libraries, and executable files), etc. for the computer 1220.

Although the description of computer-readable media above refers to a hard disk, a removable magnetic disk and an optical disk, it can also include other types of media that are readable by a computer, such as magnetic cassettes, flash memory cards, digital video disks, and the like.

A number of program modules may be stored in the drives and RAM 1225, including an operating system 1235, one or more application programs 1236, other program modules 1237, and program data 1238.

A user may enter commands and information into the personal computer 1220 through a keyboard 1240 and pointing device, such as a mouse 1242. Other input devices may include a microphone, sound card, radio or television tuner, joystick, game pad, satellite dish, digital camera, scanner, or the like. A digital camera or scanner 43 may be used to capture the target image for the detection process described above. The camera and scanner are each connected to the computer via a standard interface 44. Currently, there are digital cameras designed to interface with a Universal Serial Bus (USB), Peripheral Component Interconnect (PCI), and parallel port interface. Two emerging standard peripheral interfaces for cameras include USB2 and 1394 (also known as firewire and iLink).

In addition to a camera or scanner, watermarked images or video may be provided from other sources, such as a packaged media devices (e.g., CD, DVD, flash memory, etc), streaming media from a network connection, television tuner, etc. Similarly, watermarked audio may be provided from packaged devices, streaming media, radio tuner, sound cards, etc.

These and other input devices are often connected to the processing unit 1221 through a port interface 1246 that is coupled to the system bus, either directly or indirectly. Examples of such interfaces include a serial port, parallel port, game port or universal serial bus (USB).

A monitor 1247 or other type of display device is also connected to the system bus 1223 via an interface, such as a video adapter 1248. In addition to the monitor, personal computers typically include other peripheral output devices (not shown), such as speakers and printers.

The computer 1220 operates in a networked environment using logical connections to one or more remote computers, such as a remote computer 1249. The remote computer 1249 may be a server, a router, a peer device or other common network node, and typically includes many or all of the elements described relative to the computer 1220, although only a memory storage device 1250 has been illustrated in FIG. 7. The logical connections depicted in FIG. 7 include a local area network (LAN) 1251 and a wide area network (WAN) 1252. Such networking environments are commonplace in offices, enterprise-wide computer networks, intranets and the Internet.

When used in a LAN networking environment, the computer 1220 is connected to the local network 1251 through a network interface or adapter 1253. When used in a WAN networking environment, the personal computer 1220 typically includes a modem 1254 or other means for establishing communications over the wide area network 1252, such as the Internet. The modem 1254, which may be internal or external, is connected to the system bus 1223 via the serial port interface 1246.

In a networked environment, program modules depicted relative to the personal computer 1220, or portions of them, may be stored in the remote memory storage device. The processes detailed above can be implemented in a distributed fashion, and as parallel processes. It will be appreciated that the network connections shown are exemplary and that other means of establishing a communications link between the computers may be used.

Extensions to Other Forms of Media Object Linking

The approaches described above can be implemented for a variety of media object files, including image, graphics, video and audio files, or files containing two more different media types. Also, media objects may be linked to their metadata via data structures other than a watermark embedded in the object. For example, the object identifier need not be inserted in a watermark, but instead may be placed somewhere else in the media object file, such as a file header. Such an identifier may be inserted into the header of coded or compressed files. To extract the identifier, a decoder parses the header and extracts the object identifier. Then, the decoder forwards the identifier to a metadata server, either directly, or by launching another application, such as web browser, to issue the metadata request and output the data and/or interpret code returned from the metadata server.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The particular combinations of elements and features in the above-detailed embodiments are exemplary only; the interchanging and substitution of these teachings with other teachings in this and the incorporated-by-reference patents/applications are also contemplated.

In view of the wide variety of embodiments to which the principles of the technology can be applied, it should be recognized that the detailed embodiments are illustrative only and should not be taken as limiting the scope of the technology. Rather, I claim all such embodiments as may come within the scope and spirit of the following claims, and equivalents thereto.

What is claimed is:

1. A method involving a web server coupled to a network that includes a plurality of remote nodes, the method comprising:
   receiving a request from a remote node for data representing audio or video information that includes a first watermark;
   extracting the first watermark from the data representing the audio or video information;
   modifying, prior to sending the data to the remote node, the data representing the audio or video information based upon the first watermark;
   deriving an identifier from information included in a content object received from a remote node;
   identifying associated rendering control instructions by reference to the identifier;
   embedding a second watermark in the data that comprises a rendering control instructions identifier associated with the rendering control instructions, wherein the rendering control instructions control rendering of the data at the remote node;
   sending the data comprising the second watermark to the remote node in response to the received request;
   receiving a second request comprising the rendering control instructions identifier from the remote node; and
   sending the rendering control instructions to the remote node.

2. The method of claim 1, wherein the rendering control instructions include links to web sites.

3. The method of claim 1, further comprising:
   identifying usage control data by reference to the identifier; and
   controlling transfer of the content object in accordance with the usage control data.

4. The method of claim 1, further comprising:
   by reference to the identifier, determining that the content object should only be rendered to a subset of possible requesters; and
   sending responsive data to all requesters, wherein the sent data prevents rendering of the content object except by requesters in the subset.

5. The method of claim 1, wherein the deriving comprises applying a digital watermark decoding process to the data representing audio or visual information.

6. The method of claim 1, further comprising embedding a third watermark in the data that includes instructions for an event scheduler to take an action at a time after the remote node decodes the third watermark.

7. The method of claim 1, wherein the rendering control instructions identifier is unique to a user of the remote node.

8. The method of claim 1, wherein modifying the data comprises compressing the data.

9. The method of claim 1, wherein modifying the data comprises encrypting the data.

10. A system comprising:
a client device coupled to a network that includes a plurality of remote nodes; and
a server coupled to the network, wherein the server is configured to:
receive a request from a remote node for data representing audio or video information that includes a first watermark;
extract the first watermark from the data representing the audio or video information;
modify, prior to sending the data to the remote node, the data representing the audio or video information based upon the first watermark;
derive an identifier from information included in a content object received from a remote node;
identify associated rendering control instructions by reference to the identifier;
embedding a second watermark in the data that comprises a rendering control instructions identifier associated with the rendering control instructions, wherein the rendering control instructions control rendering of the data at the remote node;
sending the data comprising the second watermark to the remote node in response to the received request;
receiving a second request comprising the rendering control instructions identifier from the remote node; and
send the rendering control instructions to the remote node.

11. The system of claim 10, wherein the rendering control instructions include links to web sites.

12. The system of claim 10, wherein the rendering control instructions include links to web sites determined in accordance with the derived identifier.

13. The system of claim 10, wherein the identifier is configured to provide usage control data and control transfer of the content object in accordance with the usage control data.

14. The system of claim 10, wherein the server is further configured to, by reference to the identifier, determine that the content object should only be rendered to a subset of possible requesters; and wherein the server is configured to send responsive data to all requesters, wherein the sent data prevents rendering of the content object except by requesters in the subset.

15. The system of claim 10, wherein the client device comprises a file browser configured to display in a user interface a representation of media object files stored in memory.

16. The system of claim 15, wherein the identifier is derived by the file browser using a file browser extension.

17. The system of claim 16, wherein the file browser extension is configured to display an extension of user interface metadata or an action associated with the media object file via the identifier.

18. The system of claim 16, wherein the file browser extension displays the metadata or action in a context menu extension of the user interface of the file browser.

19. A non-transitory computer-readable medium having instructions stored thereon that when executed by a computing system cause the computing system to perform operations comprising:
receiving, at the computing system, a request from a remote node for data representing audio or video information that includes a first watermark, wherein the computing system is coupled to a network that includes a plurality of remote nodes;
extracting the first watermark from the data representing the audio or video information;
modifying, prior to sending the data to the remote node, the data representing the audio or video information based upon the first watermark;
deriving an identifier from information included in a content object received from a remote node;
identifying associated rendering control instructions by reference to the identifier;
embedding a second watermark in the data that comprises a rendering control instructions identifier associated with the rendering control instructions, wherein the rendering control instructions control rendering of the data at the remote node;
sending the data comprising the second watermark to the remote node in response to the received request;
receiving a second request comprising the rendering control instructions identifier from the remote node; and
sending the rendering control instructions to the remote node.

20. The non-transitory computer-readable medium of claim 19, wherein the operations further comprise embedding a third watermark in the data that includes instructions for an event scheduler to take an action at a time after the remote node decodes the third watermark.

* * * * *